United States Patent
Burczyk et al.

(10) Patent No.: US 6,631,644 B2
(45) Date of Patent: Oct. 14, 2003

(54) DIFFERENTIAL PRESSURE PICKUP

(75) Inventors: Dietfried Burczyk, Teltow (DE); Wolfgang Dannhauer, Teltow (DE); Frank Löffler, Potsdam (DE); Ralf Nürnberger, Potsdam (DE); Friedrich Schwabe, Kleinmachnow (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/877,009

(22) Filed: Jun. 11, 2001

(65) Prior Publication Data
US 2002/0017143 A1 Feb. 14, 2002

(30) Foreign Application Priority Data
Jul. 13, 2000 (EP) .............................. 00115175

(51) Int. Cl.[7] ............................ G01L 13/02; G01L 15/00
(52) U.S. Cl. ............................................ 73/716; 73/715
(58) Field of Search ........................ 73/716, 719, 720, 73/336, 717, 715, 706, 722

(56) References Cited

U.S. PATENT DOCUMENTS
4,091,682 A * 5/1978 Abbott et al. .................. 73/702
4,539,850 A * 9/1985 Ziegler ......................... 73/706

FOREIGN PATENT DOCUMENTS
DE 4244257 A1 6/1994

* cited by examiner

Primary Examiner—Andrew H. Hirshfeld
Assistant Examiner—Marissa Ferguson
(74) Attorney, Agent, or Firm—Jones, Tullar & Cooper, P.C.

(57) ABSTRACT

A differential pressure pickup with a small hysteresis volume which has a sensor element, two pressure measuring chambers adjacent thereto, two pressure receiving chambers closed off by separating diaphragms and two overload chambers separated from each other by an overload diaphragm, in which pickup the overload diaphragm has a closed outer edge and a closed inner edge and is firmly restrained along its outer edge and its inner edge.

4 Claims, 2 Drawing Sheets

DIFFERENTIAL PRESSURE PICKUP

TECHNICAL FIELD

The invention relates to a differential pressure pickup with a sensor element, a first and a second pressure measuring chamber, respectively adjacent to the sensor element, a first pressure receiving chamber, closed off by a first separating diaphragm, a second pressure receiving chamber, closed off by a second separating diaphragm, a first overload chamber, which is connected to the first pressure receiving chamber by a first line and which is connected to the first pressure measuring chamber by a second line, a second overload chamber, which is connected to the second pressure receiving chamber by a third line and which is connected to the second pressure measuring chamber by a fourth line, a liquid filling the first and second pressure receiving chambers, the first and second overload chambers, the first and second pressure measuring chambers and also the first, second, third and fourth lines, and an overload diaphragm, by which the first and second overload chambers are separated from each other.

BACKGROUND OF THE INVENTION

Pressure pickups are usually able to be connectable by means of process connections, so that a first pressure acts on the first separating diaphragm and a second pressure acts on the second separating diaphragm. The pressures are transmitted into the pressure measuring chambers via the liquid and they bear against the sensor element. The sensor element, for example a piezoresistive differential pressure measuring cell, emits an output signal which is proportional to the difference between the first pressure and the second pressure. The output signal is available for further processing, evaluation and/or display.

Differential pressure pickups are used for measuring differential pressure as a process variable in many applications. Apart from the differential pressure as such as a measured variable, a differential pressure pickup can also be used to determine a filling level in a container on the basis of a hydrostatic pressure differential. Equally, a flow rate can be determined for example from the difference in pressure between two different locations of different cross section in a channel.

DE-A 42 44 25 7 describes a differential pressure pickup with a sensor element, a first and a second pressure measuring chamber, respectively adjacent to the sensor element, a first pressure receiving chamber, closed off by a first separating diaphragm, a second pressure receiving chamber, closed off by a second separating diaphragm, a first overload chamber, which is connected to the first pressure receiving chamber by a first line and which is connected to the first pressure measuring chamber by a second line, a second overload chamber, which is connected to the second pressure receiving chamber by a third line and which is connected to the second pressure measuring chamber by a fourth line, a liquid filling the first and second pressure receiving chambers, the first and second overload chambers, the first and second pressure measuring chambers and also the first, second, third and fourth lines, and an overload diaphragm, by which the first and second overload chambers are separated from each other.

In the case of the pressure pickup described, the overload diaphragm is in the form of a disk and is firmly restrained at its outer edge.

In the case of overloading, i.e. if a pressure which is greater than a permissible upper limit value for which the pressure measuring pickup is designed acts on one of the separating diaphragms, the separating diaphragm is pressed against its diaphragm bed. The volume of liquid displaced by the deflection of the separating diaphragm passes through one of the lines from the pressure inlet chamber into the assigned overload chamber and leads to a deflection of the overload diaphragm from its zero position. In the volume additionally available on one side as a result of the deflection of the overload diaphragm, at least part of the displaced volume of liquid is accommodated for the duration of the overload. The pressure which acts on the sensor element in the case of overloading is limited in this way and the sensor element is protected against being overloaded.

In the case of overloading, very great forces can act on the overload diaphragm very quickly. Very great stresses occur in particular where the overload diaphragm is restrained at its outer edge, and can result in plastic deformations, i.e. deformations which remain even after the overloading has diminished. In a corresponding way, the overload diaphragm does not return to its original zero position and both overload chambers have a volume which has changed in comparison with the original state. The difference between the volumes of an overload chamber before and after the occurrence of the case of overloading is referred to below as the hysteresis volume. The hysteresis volume has a direct effect on the pressure distribution in the pressure pickup and consequently falsifies the measurement result.

SUMMARY OF THE INVENTION

It is an object of the invention to specify a differential pressure pickup of the type stated above which has a low hysteresis volume.

For this purpose, the invention comprises a differential pressure pickup of the type stated at the beginning in which the overload diaphragm has a closed outer edge and a closed inner edge and is firmly restrained along its outer edge and its inner edge.

According to one embodiment of the invention, the overload diaphragm is in the form of an annular disk.

According to a further embodiment, each overload chamber is bounded by the overload diaphragm and an essentially concave wall lying opposite the latter.

According to one embodiment of the invention, one of the lines is led through the center of the overload diaphragm.

One advantage of such a differential pressure pickup is that it has a very low hysteresis volume in comparison with pressure pickups with overload diaphragms in the form of a disk.

An infinitesimal annular disk segment of the width $\Delta r$ deflected by a distance y from its zero position encloses under it a volume $\Delta V = y(r)*(2\pi r \, \Delta r)$, which is proportional to its radius r. Plastic deformations occurring specifically at the outer edge of an overload diaphragm therefore account for a great proportion of the hysteresis volume.

In the case of overloading, the forces acting on an overload diaphragm designed according to the invention are distributed proportionately between its inner restraint and outer restraint. Accordingly, stresses occurring at the outer restraint, and consequently also the resultant plastic deformations, are less than in the case of a separating diaphragm without an inner restraint.

BRIEF DESCRIPTION OF THE DRAWINGS

The invention and further advantages are explained in more detail below with reference to the drawings, in which an exemplary embodiment is represented.

DESCRIPTION OF THE PREFERRED EMBODIMENTS

Figure 1:
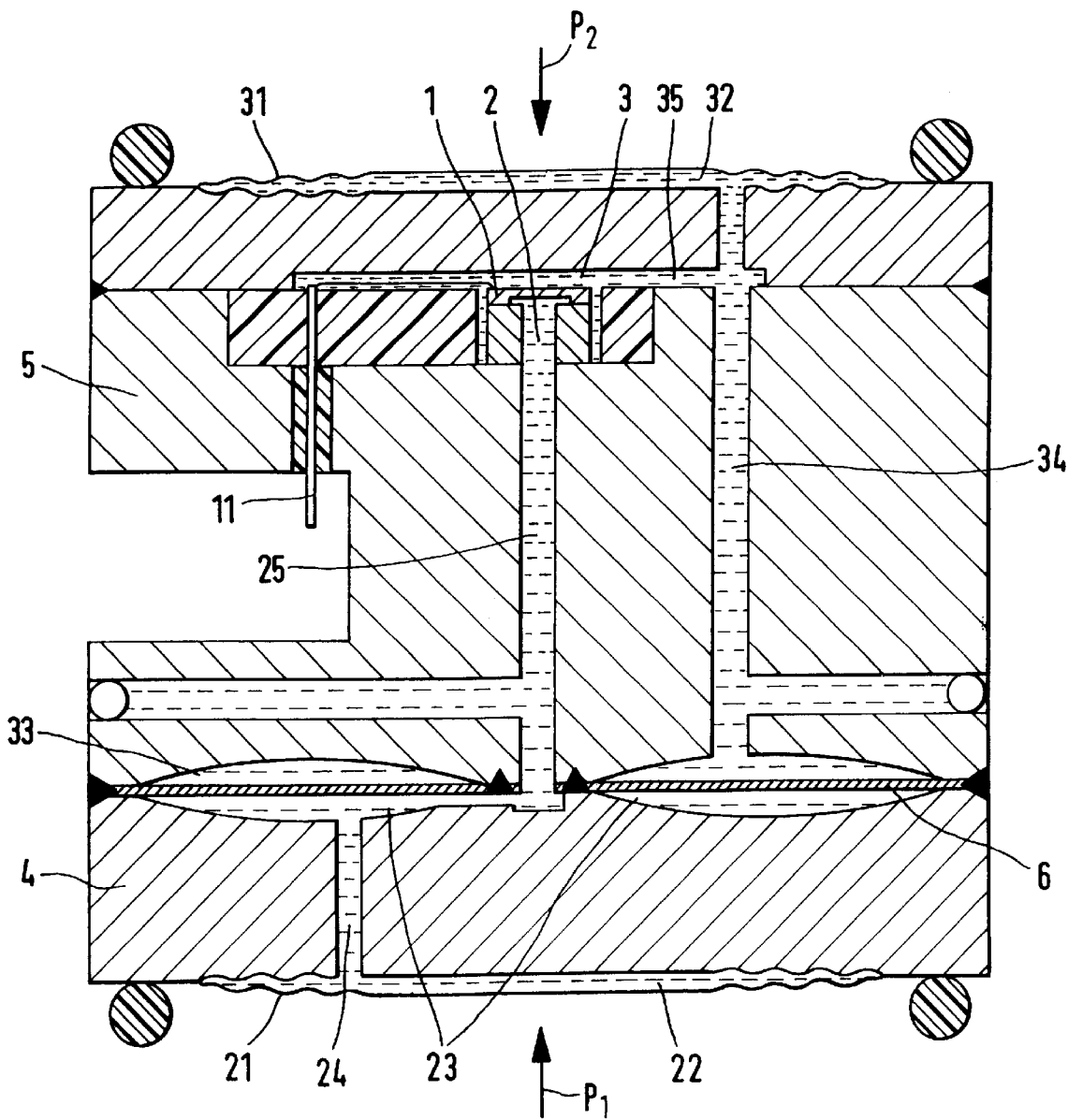
FIG. 1 shows a longitudinal section through a differential pressure pickup according to the invention.

A longitudinal section through a differential pressure pickup is represented in FIG. 1. The differential pressure pickup comprises a pressure receiving unit, a support arranged thereupon for a sensor element 1 and a housing adjacent thereto, not represented in FIG. 1, for example for receiving electronic circuitry.

The sensor element 1 comprises, for example, a silicon chip of the diaphragm type. Adjacent to the sensor element 1 are a first pressure measuring chamber 2 and a second pressure measuring chamber 3. A pressure prevailing in the first pressure measuring chamber 2 bears on one side of the diaphragm, a pressure prevailing in the second pressure measuring chamber 3 bears on the opposite side of the diaphragm. The resultant deflection of the diaphragm is a measure of the differential pressure acting on it. Serving as electromechanical transducers are, for example, piezoresistive elements which are integrated in the diaphragm, combined to form a bridge circuit and generate an output signal proportional to the differential pressure. The output signal is available for further processing and/or display via a line 11.

The pressure recording unit has a first pressure receiving chamber 22, closed off by a first separating diaphragm 21, and a second pressure receiving chamber 32, closed off by a second separating diaphragm 31. The pressure receiving unit may be mounted for example between two flanges (not represented in FIG. 1), which each have a process connection, through which a measuring medium can be fed to the respective separating diaphragm 21, 31.

The pressure receiving unit comprises a first and a second solid block 4, 5, mounted to each other with an overload diaphragm 6 arranged there between. On both sides of the overload diaphragm 6, the respective neighboring block 4, 5 has a recess. The recesses may preferably have a base area similar to that of or equal the overload diaphragm and their wall is substantially concave.

The overload diaphragm 6 and the wall opposite the latter of the recess arranged in the first block 4 define the first overload chamber 23 which is connected to the first pressure receiving chamber 22 by a first conduit 24. A second conduit 25 forms a connection between the first overload chamber 23 and the first pressure measuring chamber 2.

In a corresponding way, the overload diaphragm 6 and the wall of the recess arranged in the second block 5 define a second overload chamber 33, which is connected to the second pressure receiving chamber 32 by means of a third conduit 34.

A fourth conduit 35 forms a connection between the second overload chamber 33 and the second pressure measuring chamber 3. The first and second overload chambers 23, 33 are separated from each other by the overload diaphragm 6.

The first and second pressure receiving chambers 22, 32, the first and second overload chambers 23, 33, the first and second pressure measuring chambers 2, 3 and also the first, second, third and fourth conduits 24, 25, 34, 35 are filled with a liquid. This is preferably a liquid which is as incompressible as possible with a low coefficient of thermal expansion, for example a silicone oil.

The overload diaphragm 6 has a closed outer edge and a closed inner edge and is firmly restrained along its outer edge and its inner edge.

In the exemplary embodiment represented in FIG. 1, the overload diaphragm is in the form of an annular disk. Its inner circular edge is welded onto the block 5. Its outer, likewise circular, edge is welded both to the first block 4 and to the second block 5. This welded connection also has the effect of connecting the first and second blocks 4, 5 to each other.

Since the overload diaphragm 6 has a closed inner edge, it is possible to lead one or more conduits through the overload diaphragm 6.

In the exemplary embodiment represented in FIG. 1, the conduit 25 runs from the first overload chamber 23 through the overload diaphragm 6. This offers the advantage that only the block 5 is very complex to produce, while the block 4 only has a single conduit, that is the first line 24.

Other arrangements of the conduits are also possible, in which there are connections from each of the overload chambers 23, 33 to the pressure receiving chamber 22, 32 assigned to it and to the pressure measuring chamber 2, 3 assigned to the latter. The individual conduits also do not have to run entirely separately from one another, but may be interconnected or have portions which are shared by a plurality of conduits. This is the case for example with the conduits 34 and 35 represented in FIG. 1.

In comparison to conventional differential pressure pickups with overload diaphragms which have only an outer edge and in which only the outer edge is firmly restrained, differential pressure pickups with an overload diaphragm 6 restrained at its closed outer edge and at its closed inner edge have a very much smaller hysteresis volume in respect of the same volume that is additionally available on one side in the case of overloading due to the deflection of the overload diaphragm 6. This is explained in more detail on the basis of the following comparison by way of example of an overload diaphragm in the form of a disk and an overload diaphragm in the form of an annular disk.

The possibility of feeding through conduits, here the line 25, offers the advantage that it is possible for pressure to be fed directly to the sensor element 1 on both sides of the pressure pickup. Complex bypass conduits, which in particular also run outside the pressure pickup, are no longer required in the case of a pressure pickup according to the invention. This leads to a considerable structural simplification in comparison to conventional pressure pickups, which often have complex bypass conduits.

This structural simplification is accompanied by a reduction in the amount of liquid needed in the pressure pickup for the pressure transmission. Since the liquid always has a finite coefficient of thermal expansion and a temperature-induced change in liquidvolume changes the properties of the pressure pickup, a design which requires less liquid improves the measuring accuracy.

Figure 2:
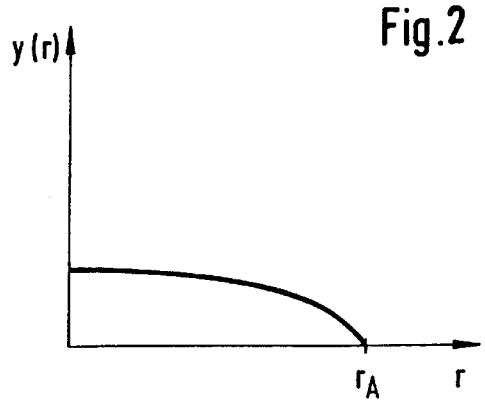
FIG. 2 shows the maximum deflection of a diskshaped overload diaphragm as a function of the radius.
Figure 3:
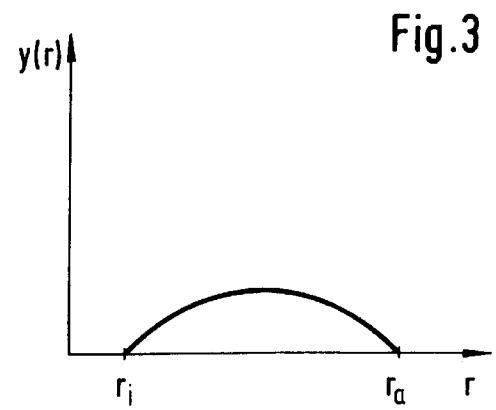
FIG. 3 shows the maximum deflection of an overload diaphragm shaped as an annular disk as a function of the radius

FIG. 2 shows the maximum deflection y(r) of an overload diaphragm in the form of a disk as a function of the radius. The maximum deflection y(r) is at a maximum in the center of the diaphragm and decreases toward its edge. At the outer edge of the overload diaphragm, the outer radius of which is denoted by $r_A$, the deflection is always equal to zero. By contrast, an overload diaphragm in the form of an annular disk has a maximum deflection y(r) of which the maximum value lies between its inner radius $r_i$ and its outer radius $r_a$. FIG. 3 shows the maximum deflection of an overload diaphragm in the form of an annular disk as a function of the radius. The deflection y(r) decreases from the maximum in both directions and is equal to zero at its inner edge $r_i$ and at its outer edge $r_a$.

Figure 4:
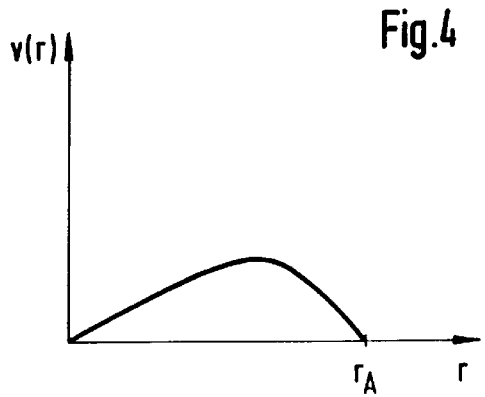
FIG. 4 shows the volume contained in an infinitesimal annular-cylindrical region under maximum deflection of a diskshaped overload diaphragm as a function of the radius.
Figure 5:
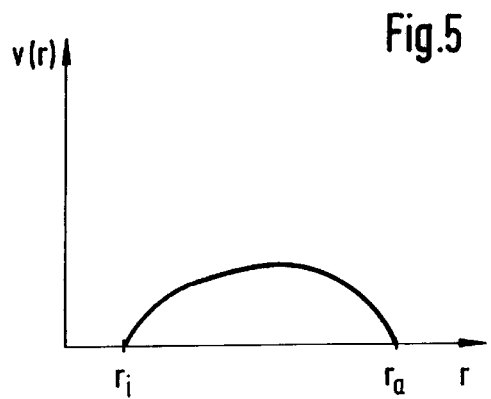
FIG. 5 shows the volume contained in an infinitesimal annular-cylindrical region under maximum deflection of an overload diaphragm shaped as an annular disk as a function of the radius.

FIG. 4 shows the volume V(r) contained in an infinitesimal annular-cylindrical region with the radius r under maximum deflection y(r) of an overload diaphragm in the form of a disk as a function of the radius. FIG. 5 shows this volume V(r) under maximum deflection y(r) of an overload diaphragm in the form of an annular disk.

The volume V(r) is determined by the equation $$V(r) = \int_{r-\delta r}^{r+\delta r} dr 2\pi r y(r)$$

The volume additionally available on one side in the case of overloading due to the deflection of the overload diaphragm in the case of the stated types of overload diaphragm corresponds to the integral over V(r), that is the area under the curve. It consequently becomes clear that an inner region with a small radius accounts for a small proportion of this additional volume. An outer region accounts for a large proportion of this additional volume.

An overload diaphragm firmly restrained at its inner edge and at its outer edge must therefore have only a slightly larger outer diameter than an overload diaphragm restrained only at its outer edge in order for the same additional volume to be available in the case of overloading. The volume required is predetermined by the volume of the pressure receiving chambers in the unloaded state, i.e. when no process pressure is bearing.

If a case of overloading occurs, the forces acting on an overload diaphragm 6 designed according to the invention are distributed in a proportional manner between its inner restraint and outer restraint. Accordingly, stresses occurring at the outer restraint, and consequently also the resultant plastic deformations, are less than in the case of an overload diaphragm without inner restraint.

Figure 6:
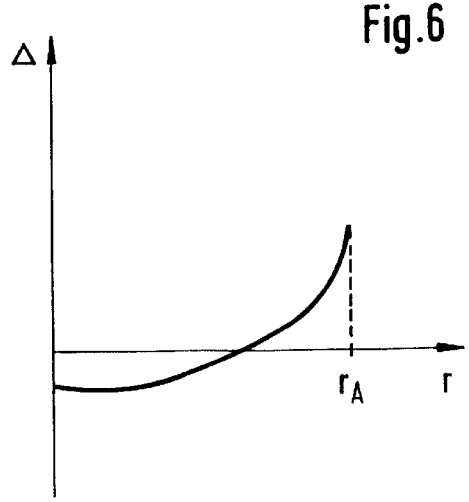
FIG. 6 shows a deformation, i.e. elongation or compression, of a diskshaped overload diaphragm in the case of overloading.
Figure 7:
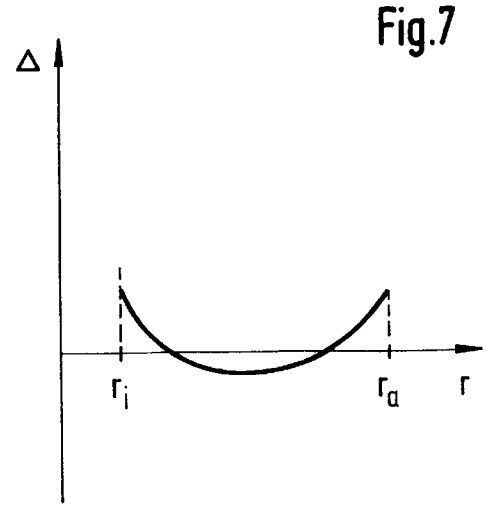
FIG. 7 shows a deformation, i.e. elongation or compression, of an overload diaphragm shaped as an annular disk in the case of overloading.

The permanent deformations are elongations or compressions of the overload diaphragm 6. FIG. 6 shows a deformation of a conventional overload diaphragm in the form of a disk in the case of overloading. FIG. 7 shows the deformation of an overload diaphragm in the form of an annular disk under the same conditions. In both figures, the deformation Δ(r) is respectively indicated as a function of the radius r. Positive values of Δ(r) mean an elongation of the overload diaphragm, negative values mean a compression.

As represented in FIG. 6, a strong elongation occurs at the outer edge of the overload diaphragm in the form of a disk and a compression occurs in the center. A continuous transition lies in between. In the case of an overload diaphragm in the form of an annular disk, an elongation occurs at the outer edge and at the inner edge. However, its amplitude is distinctly less than in the case of an overload diaphragm in the form of a disk. As a result, the hysteresis volume of an overload diaphragm in the form of an annular disk is distinctly less than that of an overload diaphragm in the form of a disk.

What is claimed is:

1. A differential pressure pickup, comprising:

a sensor element;

a first and a second pressure measuring chamber, respectively adjacent to said sensor element;

first and second separating diaphragms;

a first pressure receiving chamber, closed off by said first separating diaphragm;

a second pressure receiving chamber, closed off by said second separating diaphragm;

first, second, third and fourth conduits;

a first overload chamber, connected to said first pressure receiving chamber by said first conduit, and to said first pressure measuring chamber by said second conduit;

a second overload chamber, connected to said second pressure receiving chamber by said third conduit and to said second pressure measuring chamber by said fourth conduit;

a liquid filling said first and second pressure receiving chambers, said first and second overload chambers, said first and second pressure measuring chambers and also said first, second, third and fourth conduits; and an overload diaphragm, by which the first and second overload chambers are separated from each other, wherein:

said overload diaphragm comprises an annular diaphragm with an outer edge and an inner edge, said overload diaphragm being firmly restrained along its outer edge and its inner edge.

2. The differential pressure pickup as claimed in claim 1, further wherein:

said overload diaphragm is in the form of an annular disk.

3. The differential pressure pickup as claimed in claim 1, further wherein:

each overload chamber is bounded by the overload diaphragm and a substantially concave wall lying opposite said overload diaphragm.

4. The differential pressure pickup as claimed in claim 1, further wherein:

one of the conduits is led through the center of said overload diaphragm.

* * * * *